United States Patent [19]
Woo et al.

[11] Patent Number: 5,157,078
[45] Date of Patent: Oct. 20, 1992

[54] GLYCIDYL-EPOXY-ACRYLIC COPOLYMERS

[75] Inventors: James T. K. Woo, Medina; Gary C. Pompignano; Kevan A. Packard, both of North Royalton, all of Ohio

[73] Assignee: The Glidden Company, Cleveland, Ohio

[21] Appl. No.: 528,375

[22] Filed: May 25, 1990

[51] Int. Cl.$^5$ .................. C08F 8/00; C08L 63/00
[52] U.S. Cl. ........................ 525/109; 525/531
[58] Field of Search ............ 525/531, 922, 930, 109

[56] References Cited

U.S. PATENT DOCUMENTS

| | | | |
|---|---|---|---|
| 4,285,847 | 8/1981 | Ting | 524/504 |
| 4,335,028 | 6/1982 | Ting et al. | 428/418 |
| 4,482,671 | 11/1984 | Woo et al. | 525/531 |
| 4,522,961 | 6/1985 | Martino et al. | 523/403 |
| 4,532,309 | 7/1985 | Lindert | 525/531 |

*Primary Examiner*—John C. Bleutge
*Assistant Examiner*—Randy Gulakowski
*Attorney, Agent, or Firm*—Thomas M. Schmitz

[57] ABSTRACT

A protective paint coating containing a polymeric binder having both hydrophobic and hydrophilic moieties in the polymeric structure comprises an acrylic-graft terpolymer. The terpolymer comprises aliphatic-modified glycidyl acrylate and epoxy resin coreacted with diphenol to form the terpolymer. Ethylenically unsaturated monomers, including carboxyl monomers, are in-situ copolymerized in the presence of the terpolymer to produce the acrylic-graft terpolymer. The aliphatic-modified glycidyl acrylate component of the terpolymer comprise the reaction product of a glycidyl acrylate and a branched aliphatic ethylenic monomer having a branched chain of 2 to 20 carbon atoms. The branched aliphatic chain and the carboxyl functionality provide the self-contained wetting agent properties to the polymeric binder structure.

10 Claims, No Drawings

GLYCIDYL-EPOXY-ACRYLIC COPOLYMERS

This invention pertains to protective surface coatings applied to substrates as continuous films for the purposes of decorative appearance as well as protection of the substrate, and more particularly to a glycidyl-diphenol-epoxy terpolymer grafted with acrylic monomers including carboxyl monomers to provide a graft terpolymer containing a wetting agent structure within the graft terpolymer structure.

BACKGROUND OF THE INVENTION

This invention is directed to an aqueous dispersed polymeric binder comprising a grafted terpolymer containing copolymerized units of glycidyl acrylate, epoxy resin, diphenol such as bisphenol, grafted with copolymerized ethylenic monomers, where the binder polymer includes self-contained copolymerized wetting agent groups to facilitate adhesion of the binder to unclean substrate surfaces such as steel surfaces containing dirt and/or oil contaminants. Ordinarily, wetting agents are separate, external additives and comprise a hydrophobic and hydrophilic chain or group to obtain compatibility with the water dispersed binder as well as provide wetting properties to oily surfaces. Such additives ordinarily comprise a short aliphatic chain with a polar group such as a carboxyl group.

In accordance with this invention, the external additive wetting agent can be omitted by building certain wetting agent groups into the polymer structure. The resulting polymeric binder is particularly suitable for the interior surfaces of aluminum or steel containers and cans used for beer and beverages.

Epoxy resins are particularly desirable for use in surface coating materials as a vehicle or polymeric binder for pigments, fillers, and other additives whereby epoxy resins advantageously provide toughness, flexibility, adhesion, and chemical resistance. Water-dispersed coating compositions containing epoxy resins are highly desirable for can coating compositions. Coatings for soft drink and beer cans, for instance, are critical due to taste sensitivity wherein such sanitary can coatings must not alter the product taste of canned beverages. Taste problems can occur in a variety of ways such as by leaching of coating components into the beverage, or by adsorption of flavor by the coating, or sometimes by chemical reaction, or by some combination thereof. In commonly assigned U.S. Pat. No. 4,212,781, a process is disclosed for modifying epoxy resin by reacting the epoxy resin with addition polymerizable ethylenic monomer in the presence of at least 3% by weight of benzoyl peroxide (or the free radical initiating equivalent thereof) based on monomer at a suitable reaction temperature. This reaction produced a reaction mixture containing an in-situ formed blend of resinous materials comprising an epoxy-acrylic copolymer mixture containing epoxy resin, graft epoxy-acrylic polymer, and associatively-formed ungrafted addition polymer. The in-situ polymerized monomers include acid functional monomers to provide acid functionality in the reaction mixture sufficiently high to effect stable dispersion of the resulting reaction product in a basic aqueous medium. Similarly, commonly assigned U.S. Pat. No. 4,522,961 is directed to a mixture of polymers comprising a self-curing water dispersed or emulsion polymer, an epoxy-acrylic graft copolymer, and a phosphate additive, where self-curing water dispersed polymers were produced by polymerizing ethylenic monomers, including functional carboxyl, hydroxyl, amine or amide monomers in combination with alkylol acrylamide monomers, and thereafter blending the water-dispersed polymer with an epoxy-acrylic copolymer and preferably with a phosphated additive. Related commonly assigned patents are U.S. Pat. Nos. 4,285,847 and 4,399,241.

It now has been found that such compositions can be improved by incorporating wetting agent functional groups into the binder polymer structure itself whereby an additive wetting agent is avoided, VOC (volatile organic compound) is reduced, and good wetting and good adhesion can be obtained with metal substrates without causing blistering problems. These and other advantages of this invention will become more apparent by referring to the detailed description and illustrative examples.

SUMMARY OF THE INVENTION

Briefly, the invention is based on a polymeric binder for protective surface coatings comprising copolymerized units of 2% to 20% aliphatic-modified glycidyl acrylate containing a pendant, branched aliphatic group 30% to 80% epoxy resin, 0.2% to 30% bisphenol, and 15% to 25% in-situ acrylic copolymer containing carboxyl functionality to produce a graft terpolymer, where the polymeric binder contains hydrophilic and hydrophobic functional units exhibiting wetting agent properties. The polymeric binder can be dispersed into water with amine to produce a water-dispersed polymeric composition.

The polymeric binder is produced by mixing the glycidyl acrylate and epoxy resin together, advancing the molecular weight of the glycidyl acrylate and the epoxy resin by coreacting oxirane groups with diphenol such as bisphenol or bisphenol terminated epoxy resin to advance both the glycidyl acrylate and the epoxy resin. This is followed by in-situ copolymerization of ethylenically unsaturated monomers, including carboxyl monomers, in the presence of the advanced glycidyl and epoxy resins, where the ethylenically unsaturated monomers coreact by addition polymerization in addition to grafting onto the polymer backbone of the advanced glycidyl/epoxy. The resulting graft polymer is dispersed into water with amine to produce a water-dispersed polymer. If desired, additional ethylenic monomers can be copolymerized within the water-dispersed polymer mixture to produce an emulsion dispersion polymer.

DETAILED DESCRIPTION OF THE INVENTION

The polymeric binder in the protective coatings of this invention comprise copolymerized units of aliphatic-modified glycidyl acrylate, epoxy resin, and diphenol to produce an advanced molecular weight terpolymer which is further coreacted with ethylenic monomers, including carboxyl monomers, by in-situ copolymerization of the monomers in the presence of the terpolymer to produce the acrylic-grafted terpolymer.

Referring first to the aliphatic-modified glycidyl acrylate, this component of the terpolymer comprises the reaction product of a glycidyl acrylate with a branched aliphatic acrylic or vinyl compound having a branched carbon chain of 2 to 20 carbon atoms. Glycidyl acrylate monomers characteristically contain oxirane functionality as well as a pendant ethylenic double bond and ordinarily comprise the acrylic or methacrylic acid ester of an alkyl oxirane having an alkyl aliphatic chain containing about 2 to 12 carbon atoms. Glycidyl acrylates are typically produced by esterifying acrylic or methacrylic acid with an oxirane alkanol such as glycidol for example. Useful monomers include for example, glycidyl acrylate and glycidyl methacrylate. These glycidyl acrylate monomers are then copolymerized with aliphatic branched acrylic or vinyl monomers or oligomers by addition copolymerization through the coreactive double bonds in the glycidyl acrylate and the branched aliphatic monomer to produce the aliphatic-modified glycidyl acrylate containing both a branched aliphatic chain and a pendant glycidyl group. A particularly preferred aliphatic-modified glycidyl acrylate is the copolymer of glycidyl methacrylate and 2-ethyl hexyl acrylate. Other useful aliphatic branched monomers include, for example, butyl acrylate and methacrylate, 2-ethyl hexyl acrylate and methacrylate, octyl acrylate and methacrylate, decyl acrylate and methacrylate, isodecyl acrylate and methacrylate, dodecyl acrylate and methacrylate, lauryl acrylate and methacrylate, hexadecyl acrylate and methacrylate, octadecyl acrylate and methacrylate, 1,3-butadiene, isoprene, 1,3-piperylene.

Referring next to epoxy resins, epoxy resins are characterized by the three-membered ether group

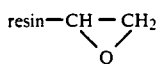

commonly referred to as an epoxy group, where such groups typically terminate epoxy backbone chains and/or branched chains. Epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4'dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred epoxy resins comprise the coreaction product of excess molar equivalents of epichlorohydrin and bisphenol-A to produce predominantly an epoxy group terminated linear molecular chain of repeating units of diglycidyl ether of bisphenol-A containing between 2 and 30 repeating copolymerized units of diglycidyl ether of bisphenol-A. In practice, an excess molar equivalent of epichlorohydrin are reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The most preferred linear epoxy resins are polyglycidyl ethers of bisphenol-A having terminating 1,2-epoxide groups and an epoxy equivalent weight between about 175 and 4,000, and a number average molecular weight from about 400 to 40,000 as measured by gel permeation chromatography (GPC). Commercially available lower molecular weight epoxy resins include Dow Chemical epoxy resins identified by trade number and average molecular weights as follows: DER 333 (380); DER 661 (525); while Shell Chemical epoxy resins are EPON 828 (380); EPON 836 (625); EPON 1001 (525). EPON 1007F (4,000); and Ciba-Geigy linear epoxy resins GT-7013 (1400); GT-7014 (1500); GT 7074 (2000); and GT-259 (1200). Although not as common, trifunctional epoxy resins are useful comprising branched chain epoxy resins where the branched chains as well as the backbone chain are each terminated with a terminal epoxide group to provide greater than two epoxide functionality. Trifunctional epoxy resins can be produced by co-reacting epichlorohydrin with polynuclear polyhydroxy phenols, trifunctional phenols, or aliphatic trifunctional alcohols.

Referring next to bisphenols for advancing the molecular weight of the glycidyl acrylate and epoxy resin, bisphenol compounds are polynuclear dihydroxyl phenols and include, for example, bisphenol-A, bisphenol-F, bisphenol-S, and 4,4' dihydroxy bisphenol with the most preferred being bisphenol-A. Bisphenol compounds can further comprise bisphenol terminated epoxy resins. The bisphenol compound reacts with the oxirane groups of both glycidyl functionality and epoxy functionality to produce a glycidyl-epoxy-bisphenol terpolymer of advanced molecular weight. The number average molecular weight of the advanced terpolymer can be between 1,500 and 40,000 and preferably between 2,500 and 20,000.

Referring next to the acrylic copolymer formed in-situ and grafted to the terpolymer of glycidyl acrylate, epoxy resin and bisphenol, the acrylic copolymer comprises non-aqueous, in-situ polymerization of ethylenically unsaturated monomers including acrylic monomers and carboxyl functional monomers in the presence of the terpolymer to produce an addition grafted terpolymer. Polymerizable ethylenically unsaturated monomers contain carbon-to-carbon unsaturation and include vinyl monomers, acrylic monomers, allylic monomers, and acrylamide monomers. Vinyl esters include vinyl acetate, vinyl propionate, vinyl butyrates, vinyl benzoates, vinyl isopropyl acetates and similar vinyl esters; vinyl halides include vinyl chloride, vinyl fluoride, and vinylidene chloride; vinyl aromatic hydrocarbons include styrene, methyl styrenes and similar lower alkyl styrenes, chlorostyrene, vinyl toluene, vinyl naphthalene, divinyl benzoate, and cyclohexane; vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclopentadiene, and dicyclopentadiene; and vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates.

Carboxyl functional monomers comprise acrylic acids and include acrylic and methacrylic acid, ethacrylic acid, alpha-chloroacrylic acid, alpha-cyanoacrylic acid, crotonic acid, beta-acryloxy propionic acid, and beta-styryl acrylic acid. On a weight basis of copolymerized monomers, the acrylic copolymer comprises between 50% and 80% acrylic monomer and between 20% and 50% carboxyl monomer, with the balance of ethylenic monomers being ethylenically unsaturated monomers other than acrylic or carboxyl monomers.

In accordance with this invention, aliphatic-modified glycidyl acrylate, epoxy resin, and diphenol such as bisphenol are mixed together and reacted to advance the molecular weight of the glycidyl functional acrylate and epoxy resin, that is, to form a terpolymer containing glycidyl acrylate chains and epoxy resin chains and coreacted together with interlinking bisphenol. The resulting terpolymer comprising glycidyl functional acrylate, epoxy resin, and bisphenol is then further reacted in-situ with the ethylenic monomers to provide an addition graft polymer structure. The polymerization of various ethylenic monomers is initiated by forming a radical on the polymer backbone by hydrogen abstraction using benzoyl peroxide or the equivalent peroxide or azo initiator, where ethylenic chains graft to the terpolymer backbone followed by double bond of the various ethylenic monomers. On a weight basis, the grafted terpolymer of this invention comprises between 2% and 20% glycidyl functional acrylate copolymer between 30% and 80% epoxy resin, 0.2% to 30% bisphenol, and between 15% and 25% copolymerized ethylenically unsaturated monomers including acrylic and carboxyl functional monomers.

In more detail, the process steps comprise the intermixing of aliphatic-modified glycidyl acrylate with epoxy resin and bisphenol or with bisphenol terminated epoxy resin to coreact the bisphenol groups with glycidyl functionality and epoxy functionality to advance the molecular weight into the larger polymeric structure comprising a terpolymer of glycidyl functional acrylate, epoxy resin, and bisphenol. The components can be mixed together and heated in a non-aqueous medium to about 130° C. to 190° C. with about 175° C. being typical. A catalyst such as ethyl triphenyl phosphonium acetate should be added at the level of about 0.05 to 0.15% based on the weight of reactants. The reaction can take place without a solvent although preferably within an organic solvent for control purposes. A desirable solvent to use is ethylene glycol mono butyl ether or 2-butoxy-ethanol-1 at about 15% by weight of the components reacted.

The glycidyl acrylate, epoxy resin, and bisphenol terpolymer is utilized as a polymerization medium with or without organic solvent for in-situ copolymerization of the ethylenic monomers in the presence of the terpolymer. The ethylenically unsaturated monomers are activated by peroxide free radical initiator at polymerization temperatures typically between 70° C. to 170° C. and preferably between 120° C. to 150° C. Typically above about 3% and preferably between 5 and 10 peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred; azo initiators such as azo bisisobutyronitrile an dimethylazobis-isobutyrate; as well as alkali metal persulfate or ammonium persulfates. Mercaptans can be added to provide copolymers of low molecular weight. The resulting graft polymer comprising the terpolymer having acrylic copolymer addition copolymerized by grafting from the epoxy backbone. The resulting graft terpolymer can be dispersed into water by neutralizing the carboxyl groups on the grafted terpolymer. Fugitive bases such as primary, secondary, and tertiary alkyl, alkanol, or aromatic amines are useful aminating agents as well as alkanolalkyl mixed amines such as monoethanol amine, dimethyl ethanolamine, diethanol amine, triethyl amine, dimethyl aniline, ammonium hydroxide and similar amine bases. Ordinarily between about 7% and 15% by weight amine base can be added to the graft terpolymer to disperse the terpolymer into water. The resulting water-dispersed terpolymer typically can contain between about 15% and 30% polymeric solids dispersed into water.

In accordance with a further aspect of this invention, the water-dispersed, acrylic graft terpolymer can be used as a polymerization medium wherein second step ethylenically unsaturated monomers can be overpolymerized or copolymerized in-situ to produce a polymeric emulsion dispersion of acrylic-graft terpolymer. On a weight basis, the post added ethylenic monomers can comprise between 5 weight parts and 50 weight parts ethylenic monomer per 100 weight parts grafted terpolymer solids. The post added ethylenic monomers can comprise by weight between 40% and 60% acrylic monomers with the balance being other ethylenic monomers as previously described hereinbefore.

Accordingly, the polymeric binder for paint coatings of this invention comprise a polymeric binder having a self-contained wetting agent structure in the polymeric structure. The wetting agent structure comprises hydrophilic structures represented by the interpolymerized carboxylic monomer and hydrophobic structure represented by the pendant branched aliphatic structure represented by the interpolymerized aliphatic-modified glycidyl acrylate.

The merits of this invention are further illustrated by the following examples.

EXAMPLE 1

Preparation of Glycidyl Acrylate Copolymer

Into a 3 liter round bottom flask fitted with a nitrogen inlet, water cooled condenser, temperature probe, and mechanical stirrer was charged 748.6 g of 2-butoxyethanol. The flask was heated to 115° C. under nitrogen sparge. A monomer mixture of 1632.0 g of 2-ethylhexyl acrylate, 68.0 g glycidyl methacrylate, 21.8 g benzoyl peroxide (78% in water), and 65.0 g of 2-butoxyethanol was added to solvent in 2.5 hours. The mixture was held at 115° C. for 30 minutes, and then 4.3 g of t-butyl perbenzoate were added. The reaction was continued for an additional hour and the mixture was then allowed to cool. The product obtained was viscous clear resin solution of 68.2% nonvolatile and 0.38% oxirane.

EXAMPLE 2 a) Preparation of Graft Copolymer Intermediate

Into a 2 liter round bottom flask fitted with a nitrogen inlet, water cooled condenser, temperature probe, and mechanical stirrer was charged 210 g of Bisphenol A, 128.6 g of an EHA/GMA copolymer (96/4% wt./wt., Mn=3300, 0.38% oxirane) as a solution in 2-butoxyethanol (68% NV) adding a total of 188.5 g of the copolymer solution, and 0.25 g of ethyl triphenyl phosphonium acetate. The reaction mixture was heated to 140° C. where heating was stopped. The reaction exotherm carried the temperature to 153° C. After 50 min. at 140° C. to 150° C., the heating mantle was dropped and the mixture was allowed to cool while the flask was charged with 302 g of DER 333 liquid epoxy resin, 100 g of 2-butoxyethanol, and 0.40 g of ethyl triphenyl phosphonium acetate. The reaction mixture was heated under a nitrogen sparged vacuum to regain 120° C. and 7 g of volatiles were stripped from the reaction mixture at 120°-130° C. and 20-25 in. Hg vacuum. The reaction mixture was then slowly heated to 175° C. under a nitrogen sparge. The reaction mixture was then held at 170°-180° C. for 2 hours. At the end of this time, the oxirane value of the product was 0.07 and resin had a Gardner-Holdt viscosity of S- at 40% NV in 2-butoxyethanol. 15.4 g of 2-butoxyethanol and 300 g of butanol were then added and the temperature stabilized to 115° C.

A monomer mixture of 103.2 g of methacrylic acid, 54.0 g of styrene, 1.5 g of ethyl acrylate, 14.01 g of benzoyl peroxide (78% in water), and 40.6 g of 2-butoxyethanol was added to the hot epoxy solution in 2 hours. 22.7 g of 2-butoxyethanol was used to rinse the monomer addition flask. The mixture was held at 115° C. for 90 min. and then 74.6 g of dimethylethanolamine was added to the reaction mixture after a 30 min. hold, 1307 g of this resin mixture was dropped into a solution of 1563 g of demineralized water and 88.4 g of 2-butoxyethanol which had been preheated to 50° C. This was then diluted with 265.2 g of demineralized water to bring the final NV to 23%. The reaction mixture was then allowed to cool to room temperature while maintaining agitation. The nonvolatile of the dispersion was 24.4%, acid number was 87.2, base number was 55.6, and % neutralization was 64%.

b) Preparation of EHA Modified Epoxy-Acrylic Terpolymers

Into a 3 liter round bottom flask equipped with a nitrogen inlet, water cooled condenser, temperature probe and mechanical stirrer was charged 1450.6 g of the intermediate from (a) above, and 758.6 g of demineralized water. The reaction mixture was heated under a nitrogen purge to 85° C. and a monomer solution of 59.8 g of butyl acrylate and 20.2 g of methyl methacrylate was added. This was then followed by 76.3 g of styrene and 4.18 g of t-butyl peroxy pivalate (75% in mineral spirits) added in 2 hours. The reaction mixture was then held at 85° C. for one hour and then 2.12 g of t-butyl peroxypivalate was added. After an additional hour at 85° C., 2.00 g of t-butyl peroxypivalate was added and the reaction mixture was held at 85° C. for one additional hour. The reaction mixture was then allowed to cool to room temperature while being agitated. The product obtained was an aqueous polymer dispersion of 19.4% nonvolatile, acid number was 67.1, base number was 43.0 and % neutralization was 64%.

EXAMPLE 3 a) Preparation of Graft Copolymer Intermediate

Into a 2 liter round bottom flask fitted with nitrogen inlet, water cooled condenser, temperature probe, and mechanical stirrer was charged 236.1 g of Bisphenol A, 64.0 g of and EHA/GMA copolymer (96/4% wt./wt., Mn=3300, 0.38% oxirane) as a solution in 2-butoxyethanol (68% NV) adding a total of 93.8 g of the copolymer solution, 0.19 g of ethyl triphenyl phosphonium acetate, and 32.3 g of 2-butoxyethanol. The reaction mixture was heated to 115° C. under a nitrogen sparge. Then 0.19 g of ethyl triphenyl phosphonium acetate was added. The temperature was then slowly raised to 140°-150° C. and reaction was continued for 1 hour. The reaction mixture was then cooled to 125° C. and 339.9 g DER 333 epoxy resin, 97.7 g of 2-butoxyethanol, and 0.48 g of ethyl triphenyl phosphonium acetate was added to the reaction mixture. The reaction mixture was then heated to 175° C. After 2 hours at this temperature 15.2 g of 2-butoxyethanol and 300.8 g of n-butanol were added as the reaction mixture was allowed to cool.

The reaction mixture in the flask was then reheated to 115° C. and a monomer mixture of 103.2 g of methacrylic acid, 54.0 g of styrene, 1.5 g of ethyl acrylate, 14.0 g of benzoyl peroxide (78% in water), and 40.5 g of 2-butoxyethanol was added in 2 hours. 22.8 g of 2-butoxyethanol was used to rinse the monomer addition flask. The mixture was held at 115° C. for 2 hours and then 74.8 g of dimethylethanolamine was added to the reaction mixture. After a 30 minute hold, 1309 g of the resin mixture was dropped into a solution of 88.0 g of 2-butoxyethanol and 1563 g of demineralized water which had been preheated to 50° C. This aqueous dispersion was then diluted with 265.2 g of demineralized water to bring the final NV to 23%. The dispersion was then allowed to cool to room temperature with stirring. The nonvolatile of the dispersion was 24.2%, acid number was 85.2, base number was 57.1, and % neutralization was 67%.

b) Preparation of EHA Modified Epoxy-Acrylic Terpolymers

Into a 3 liter round bottom flask equipped with a nitrogen inlet, water cooled condenser, temperature probe, and mechanical stirrer was charged 1500.1 g of the intermediate from (a) above, and 576.5 g of demineralized water. The reaction mixture was heated under a nitrogen purged atmosphere to 85° C. and a monomer solution of 61.9 g of butyl acrylate and 21.0 g of methyl methacrylate was added. This was then followed by the addition of 79.3 g of styrene and 4.30 g of t-butyl peroxypivalate (75% in mineral spirits) added in 2 hours. The reaction mixture was then held at 85° C. for one hour and then 2.13 g of t-butyl peroxypivalate was added. After a one hour hold at 85° C., 2.24 g of t-butyl peroxypivalate was added and the reaction mixture was held at 85° C. for an additional hour. The reaction mixture was then allowed to cool to room temperature while being agitated. The product obtained was an aqueous polymer dispersion of 21.2% nonvolatile, acid number was 61.6, base number was 40.5, and % neutralization was 66%.

EXAMPLE 4 a) Preparation of Graft Copolymer Intermediate

Into a 2 liter round bottom flask fitted with a nitrogen inlet, water cooled condenser, temperature probe, and mechanical stirrer was charged with 1.2 g of Bisphenol A, 21.6 g of EHA/GMA copolymer (96/4% wt./wt., Mn=3300, 0.38% oxirane) as a solution in 2-butoxyethanol (68% NV) adding a total of 31.6 g of the copolymer solution, and 0.1 g of ethyl triphenyl phosphonium acetate. The reaction mixture was heated to 120°-140° C. for 30 minutes. 473.4 g of Epon 1009F epoxy resin and 119.5 g of 2-butoxyethanol and the reaction mixture was heated to attain 140° C. The flask was then charged with 0.33 g of ethyl triphenyl phosphonium acetate in 10.0 g of 2-butoxyethanol. The reaction mixture was then heated to 150° C. for one hour. The reaction mixture was then charged with 222.6 g of butanol and the temperature stabilized to 115° C.

A monomer mixture of 76.3 g of methacrylic acid, 39.9 g of styrene, 1.1 g of ethyl acrylate, 10.4 g of benzoyl peroxide (78% in water), and 30.2 g of 2-butoxyethanol was added to the hot epoxy solution in 2 hours. 17.0 g of 2-butoxyethanol was used to rinse the monomer addition flask. The mixture was held at 115° C. for two hours and then cooled to room temperature. The reaction mixture was reheated to 115° C. and 55.4 g dimethylethanol amine was added. After 30 minutes at 115° C., 906.1 g of the resin mixture was dropped into a rapidly stirred solution of 59.8 g of 2-butoxyethanol in 1051.1 g of demineralized water which had been preheated to 50° C. This was then diluted with 186.2 g of demineralized water. The aqueous polymer dispersion was then allowed to cool to room temperature while maintaining rapid stirring. The nonvolatile of the dispersion was 24.4%, acid number was 69.6, base number 50.5, and % neutralization was 73%.

b) Preparation of EHA Modified Epoxy-Acrylic Terpolymers

Into a 5 liter round bottom flask equipped with a nitrogen inlet, water cooled condenser, temperature probe and mechanical stirrer was charged 2160.4 g of the intermediate from (a) above, and 1045.4 g of demineralized water. The reaction mixture was heated under a nitrogen purged atmosphere to 85° C. and a monomer solution of 87.3 g of butyl acrylate and 11.2 g of methyl methacrylate was added. The monomer solution of 111.4 g of styrene containing 6.2 g of t-butyl peroxypivalate was then added in 2 hours. After one hour at 85° C., 3.0 g of t-butyl peroxy pivalate was added and the reaction was held at 85° C. for an additional hour. At the end of this time, 3.2 g of t-butyl peroxy pivalate was added and the reaction mixture was held for one more hour 85° C. The reaction mixture then allowed to cool to room temperature while maintaining stirring. The product obtained was an aqueous polymer dispersion of 20.7% nonvolatile, acid number of 53.3, base number of 38.9, and % neutralization of 73%.

EXAMPLE 5

These samples were evaluated in spray application for 2-piece aluminum beer and beverage can. A widely used commercial sample 640-C-552 which is an epoxy-acrylic graft copolymer was used as a comparison.

Unmodified epoxy-acrylic copolymer, 3.6 lb./gal. VOC @105 mg ave. of 12 cans was 8.7 ma., std. dev.=8.4 contact angle over PPG overcoat varnish 22 deg., s.d.=2.

Example 2, 3.1 lb./gal. VOC @100–105 mg ave. of 12 cans was 9.3 ma., std. dev.=5 contact angle over PPG overcoat varnish 20 deg., s.d.=1.

Example 3, 3.1 lb./gal. VOC @105 mg ave. of 12 cans was 10.1 ma., std. dev.=10.8 contact angle over PPG overcoat varnish19 deg., s.d.=1

Example 4, 3.1 lb./gal. VOC @110–115 mg ave. of 12 cans was 33.7 ma., std. dev.=15.6. Contact angle over PPG overcoat varnish 29 deg., s.d.=1

Unmodified epoxy acrylic terpolymer, 3.1 lb./gal. VOC @110 mg ave. of 12 cans was 28.8 ma., std. dev.=18.6. Contact angle over PPG overcoat varnish 26 deg., s.d.=2.

As can be seen the materials of Example 2 and Example 3 gave spray performance comparable to 640-C-552 but with lower VOC content. These materials also show very good wetting ability (which may contribute to their excellent spray performance), as shown by their low contact angle on aluminum plates coated with PPG's overcoat varnish (#3625-X). This material was chosen to be representative of possible contaminated can surfaces and is widely used in the industry. By comparison the material of Example 4 showed relatively poor spray performance and was slightly worse than the sample of low VOC 640-C-700 which was included as a second reference sample.

I claim:

1. In a process for producing a protective coating composition containing a polymeric binder, the process steps comprising:
    providing an aliphatic modified glycidyl acrylate polymer by copolymerizing a glycidyl acrylate monomer with an ethylenically unsaturated monomer;
    coreacting the aliphatic-modified glycidyl acrylate polymer with a diphenol and an epoxy resin to produce a glycidyl-diphenol-epoxy terpolymer;
    in-situ copolymerizing ethylenically unsaturated monomers including carboxyl monomers in the presence of the terpolymer in the presence of at least 3% by peroxide based on the weight of ethylenically unsaturated monomers copolymerized at temperatures between about 70° C. to 170° C. to produce an acrylic-graft terpolymer containing hydrophobic and hydrophilic wetting properties, said acrylic-graft terpolymer comprising on a weight basis between about 2% and 20% of said aliphatic-modified glycidyl acrylate, between about 0.2% and 30% diphenol, and between about 30% and 80% epoxy resin, and between about 15% and 25% said copolymerized ethylenically unsaturated monomers.

2. The process of claim 1 where the diphenol is a bisphenol.

3. The process of claim 2 where the bisphenol is bisphenol-A.

4. The process of claim 1 where the aliphatic-modified glycidyl acrylate polymer comprises the reaction product of a glycidyl acrylate and an ethylene monomer.

5. The process of claim 4 where the branched aliphatic ethylene monomer comprises 2-ethyl hexyl acrylate.

6. The process of claim 1 where the acrylic-graft terpolymer is dispersed into water by neutralizing with an amine to form an aqueous dispersed coating composition.

7. The process of claim 1 where between about 20% and 50% of the ethylenically unsaturated monomers copolymerized in-situ is a carboxyl monomer.

8. The process of claim 7 where the ethylenically unsaturated monomers copolymerized in-situ comprise between about 50% to 80% by weight acrylic monomer and 20% to 50% carboxyl monomer.

9. The process in claim 6 where the aqueous dispersed acrylic-graft terpolymer is used as polymerization medium, and second stage ethylenic monomers are copolymerized therein to produce an emulsion dispersion of acrylic-graft terpolymer.

10. The process of claim 9 wherein about 5 to 50 weight parts of second stage monomers are copolymerized with 100 weight parts of acrylic-graft terpolymer.

* * * * *